US007555354B2

(12) United States Patent
Walsh et al.

(10) Patent No.: US 7,555,354 B2
(45) Date of Patent: Jun. 30, 2009

(54) METHOD AND APPARATUS FOR SPATIAL REFORMATTING OF MULTI-CHANNEL AUDIO CONTENT

(75) Inventors: Martin Walsh, Scotts Valley, CA (US); Mark Dolson, Ben Lomond, CA (US)

(73) Assignee: Creative Technology Ltd, Singapore (SG)

( * ) Notice: Subject to any disclaimer, the term of this patent is extended or adjusted under 35 U.S.C. 154(b) by 222 days.

(21) Appl. No.: 11/584,125

(22) Filed: Oct. 20, 2006

(65) Prior Publication Data

US 2008/0103615 A1 May 1, 2008

(51) Int. Cl.
*G06F 17/00* (2006.01)
*H04B 1/00* (2006.01)
*H04B 1/20* (2006.01)

(52) U.S. Cl. .............................. 700/94; 381/119; 369/4

(58) Field of Classification Search .................. 700/94; 381/10, 11, 17, 18, 300, 56, 61, 27, 310, 381/1, 123, 119; 369/4; 455/556.2, 3.06, 455/556.1, 557
See application file for complete search history.

(56) References Cited

U.S. PATENT DOCUMENTS

| | | | |
|---|---|---|---|
| 4,438,525 A | 3/1984 | Shibata et al. | |
| 4,694,497 A | 9/1987 | Kasai et al. | |
| 5,761,295 A | 6/1998 | Knappe et al. | |
| 6,011,851 A | 1/2000 | Connor et al. | |
| 7,272,232 B1 | 9/2007 | Donaldson et al. | |
| 2002/0045438 A1 | 4/2002 | Tagawa et al. | |
| 2004/0136538 A1 | 7/2004 | Cohen et al. | |
| 2005/0190932 A1 * | 9/2005 | Woo et al. | 381/119 |
| 2006/0023901 A1 * | 2/2006 | Schott et al. | 381/119 |

FOREIGN PATENT DOCUMENTS

| | | |
|---|---|---|
| GB | 2255884 | 11/1992 |
| WO | WO-8602791 | 5/1986 |
| WO | WO-0178486 A2 | 10/2001 |
| WO | WO-06051001 | 5/2006 |
| WO | WO-2008051722 A2 | 5/2008 |

OTHER PUBLICATIONS

Search Report for International Application No. PCT/GB01597, (2002).

International Application Serial No. PCT/US2007/081036, International Search Report and Written Opinion mailed Aug. 21, 2008, 12 pgs.

* cited by examiner

*Primary Examiner*—Curtis Kuntz
*Assistant Examiner*—Andrew C Flanders
(74) *Attorney, Agent, or Firm*—Schwegman, Lundberg & Woessner, P.A.; Gregory J. Gorrie

(57) ABSTRACT

A method and device are described to process an event on an audio rendering device. The method may comprise rendering a first audio stream via at least a first audio signal in a first audio playback channel and a second audio signal in a second audio playback channel and monitoring occurrence of the event with an associated second audio stream. Upon occurrence of the event, the first audio signal may be panned to the second audio playback channel, the first audio signal being mixed with the second audio signal in the second audio playback channel. The second audio stream is then rendered via the first audio playback channel.

31 Claims, 8 Drawing Sheets

METHOD AND APPARATUS FOR SPATIAL REFORMATTING OF MULTI-CHANNEL AUDIO CONTENT

TECHNICAL FIELD

The present invention relates generally to processing an event on an audio rendering device.

BACKGROUND

As stereo and multi-channel home entertainment systems expand their functionality to incorporate voice communication and multiple simultaneous media streams, along with more conventional playback applications, a problem arises in that new audio streams (e.g., ring tones, voice, a "picture-in-picture" audio stream, etc.) need to be dynamically integrated into the rendered audio. The simplest solution is just to replace one set of audio signals with another, either manually or automatically, but listeners may prefer the option of attending to both the old and new audio streams simultaneously. This can be easily engineered by mixing the audio signals together, but listeners may then find it difficult to differentiate between the overlapping audio streams.

There is a need for an audio rendering system that actively facilitates "auditory multitasking" by automatically managing the simultaneous presentation of multiple audio streams so as to promote preferential attention to one of these streams. There is a further need for this facilitation to be applicable to stereo and multi-channel audio streams, and for it to be effective both for audio rendered via speakers and for audio rendered via headphones. Existing systems do not allow this to be achieved.

BRIEF DESCRIPTION OF THE DRAWINGS

The invention is illustrated by way of example, and not limitation, in the figures of the accompanying drawings, in which like reference numerals indicate the same or similar features unless otherwise indicated.

In the drawings.

DETAILED DESCRIPTION

A method and a system to provide spatial processing of audio signals are described. In the following description, for purposes of explanation, numerous specific details are set forth in order to provide a thorough understanding of the present invention. It will be evident, however, to one skilled in the art that the present invention may be practiced without these specific details. The invention is described, by way of example, with reference to processing a digital audio on a home theatre audio platform. It will, however, be appreciated that the invention can apply in any digital audio processing environment (e.g., in vehicle audio systems, Personal Computer Media Center, or the like). Thus, the invention is not limited to deployment in home theatre environment but may also find application in other audio rendering devices (portable or desktop). Further, the term "event" includes any communication or signal having associated audio. It is important to note that the term "audio" should not be restricted to any specific type of audio and may include alerts, voice communication, music or any other audio.

In an example embodiment, a method and apparatus is described to process an event on an audio rendering device. The method may comprise rendering a first audio stream via at least a first audio signal in a first audio playback channel and a second audio signal in a second audio playback channel. Occurrence of the event with an associated second audio stream is monitored and, upon occurrence of the event, the first audio signal is panned to the second audio playback channel. The first audio signal is mixed with the second audio signal in the second audio playback channel. The second audio stream is then rendered via the first audio playback channel.

In an example embodiment, it is assumed that the user is listening to a stereo or multi-channel soundtrack (e.g., a first audio stream comprising a plurality of audio signals) over a multi-channel loudspeaker system. This soundtrack might, for example, be a movie soundtrack or a multi-channel audio recording. In an example embodiment, it may also be assumed that a higher-priority audio stream (e.g., a second audio stream comprising one or more audio signals) is received and that a user elects to receive that audio stream in the foreground while maintaining the current audio or soundtrack in the background.

Figure 1:
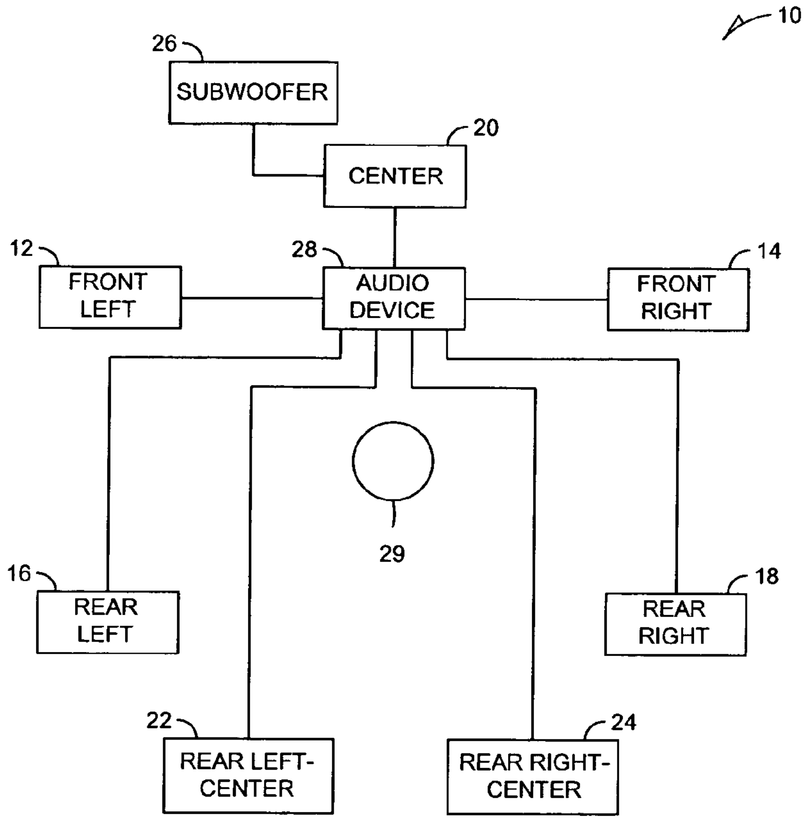
FIG. 1 shows a block diagram of a multi-channel loudspeaker system according to an example embodiment.

FIG. 1 shows a block diagram of a multi-channel audio system 10 according to an example embodiment. The system 10 may, for example, form part of a home theatre system, a vehicle audio system, or any other audio system. The system 10 is shown by way of example to be 7.1 system including left and right front loudspeakers 12, 14, left and right rear loudspeakers 16, 18, a center loudspeaker 20, left and right center rear loudspeakers 22, 24, and a subwoofer 26. The loudspeakers 10-24 and subwoofer 26 are shown to be driven by an audio device 28 (e.g., a 7.1 channel audio amplifier or receiver). As described in more detail below, the system 10 may provide a relatively robust solution that is effective both for stereo or multi-channel loudspeaker listening and for multiple listeners, or individual listeners outside a so-called "sweet spot" 29.

In an example embodiment, the audio device 28 includes functionality to dynamically alter the spatial properties of one or more audio streams (be they mono, stereo, or multi-channel) without recourse to binaural techniques. For example, the audio device 28 may be configured to perform multi-channel pair wise-panning to achieve the same (or at least similar) perceptual benefits as the binaural equivalent without the inherent restrictions (and potential) disadvantages of binaural reproduction. In an example embodiment, audio signals in adjacent playback channels are sequentially panned and mixed.

The audio device 28 may be configured to process a second audio stream such as an incoming voice or video call (or any alerts associated therewith) while watching TV, a movie or listening to music. In this example scenario, the incoming voice communication may assume a higher perceptual priority to the listener. In an example, the audio device 28 may be configured to be responsive to a picture-in-picture selection by a user. In this example embodiment, the audio device 22 may generate background audio corresponding to the 'smaller' video display of the picture-in-picture. However, in another example embodiment, the audio device may generate background audio corresponding to the 'larger' video display of the picture-in-picture.

When the listener/user accepts (or selects) a higher priority audio stream (e.g., the second audio stream), spatial reformatting of the current audio content (e.g., the first audio stream) may take place such that the higher priority audio stream is given perceptual precedence over the current audio streams while the audio event (e.g., a voice call) is taking place. When the higher priority audio stream terminates, all other audio streams may be returned to their original state. In an example embodiment, the audio device 28 may thus include a Digital Signal Processor (DSP) to perform spatial reformatting and to return to the state of the original audio stream.

In some example embodiments described herein, spatial reformatting may involve panning and mixing between current streams in the system 10. Thus, in an example embodiment, the term "panning" is intended to include progressively decreasing a gain of a particular audio signal in one channel while the gain of the particular audio signal is simultaneously increased in an adjacent channel as it is mixed with the adjacent channel.

Figure 2A:
FIG. 2A shows example panning between two audio channels.
Figure 2B:
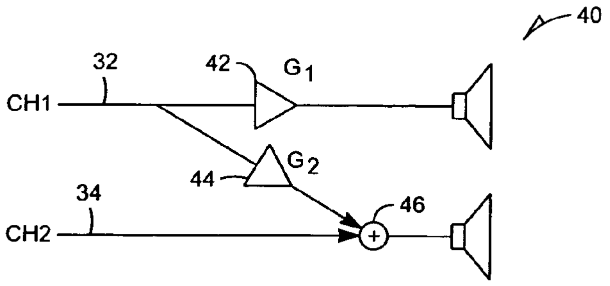
FIG. 2B shows example functional modules to perform the panning of FIG. 2A.

Embodiments of spatial processing that could occur in different example listening scenarios are described below by way of example. FIG. 2A shows an example cross-fade/mix functionality 30 from an initial playback channel 32 to a destination playback channel 34. FIG. 2B shows example functional hardware 40 to perform the panning/mix functionality 30. The example functional hardware 40 is shown to include gain components 42 and 44. An output of the gain component 44 (attenuated or amplified) feeds an audio signal from the initial playback channel 32 to a summer 46 where it is then combined with an audio signal from the destination channel 34. To facilitate the description of the example embodiments described below, in example embodiments an arrowed line from one playback channel to another with a plus sign (+) at the destination corresponds to a sequence where the content (audio signal) on the source channel is faded out and is simultaneously faded into and mixed with the contents (audio signal) of the destination playback channel. These fading functions may follow standard stereo panning laws or more complicated panning schemes such as Vector Based Amplitude Panning (VBAP). Basic pair-wise panning between playback channels is represented, for ease of explanation with a similar symbol, but without the plus sign.

It should be noted that, although some of the example embodiments described herein may be deployed in an audio device having a loudspeaker corresponding to each audio playback channel, the device and methods described herein are equally applicable if each loudspeaker is statically virtualized, for example, using Head-Related Transfer Functions (HRTFs) over headphones. Thus, the audio playback channels referred to herein may be virtualized or real audio channels.

In example embodiments, virtualization may include reproduction of a number of static audio channels over a few number of transducers such that the listener perceives the presence of the original channels in their original locations, even though they have no physical embodiment. Examples may include the virtualization of a multi-channel audio stream over headphones using HRTFs and the virtualization of multiple audio signals over loudspeakers using HRTFs and a crosstalk canceller. It should however be noted that the example embodiments may employ any post processing that involves spatial manipulation of the resulting audio signal to accomplish spatial reformatting. For example, spatial reformatting may take place after the panning methodology described herein is applied to a multi-channel stream (or network). Examples of post processing functionality include reverb, virtualization over headphone and speakers, or the like.

In an example embodiment, the audio device 28 is configured to perform multi-channel spatial reformatting to rear playback channels, for example, channels driving the loudspeakers 16, 18 in FIG. 1. The multi-channel spatial reformatting may comprise sequentially panning adjacent playback channels (virtual or otherwise) from an initial playback channel (e.g., a front channel) to a destination playback channel (e.g., rear channel) upon occurrence of an event. Audio associated with the event may be inserted into the initial playback channel and, upon termination of the event, the adjacent playback channels may be sequentially panned in a reverse direction to restore the original audio configuration.

In FIG. 3A-3I a sequence of events is shown during which an audio device processes an incoming audio stream. The processing may be performed by the audio device 28 and, accordingly, is described by way of example with reference thereto. In a default listening scenario 50, it is assumed that a current audio stream is being reproduced on a seven loudspeaker-based reproduction system via seven audio channels 52-64 with associated audio streams. The audio channels 52-64 are shown to be rendered via the loudspeakers 12-24 in FIG. 1A but may, in other embodiments, be rendered via headphones using a HRTF. The listening scenario 50 may occur before an incoming audio stream (e.g., an incoming high priority stream) is processed. The incoming audio stream may make a playback request to a controller controlling operation of the audio device 28. In an example embodiment, in the listening scenario 50, current or original audio is rendered via all the playback channels 52-64.

Figure 3A:
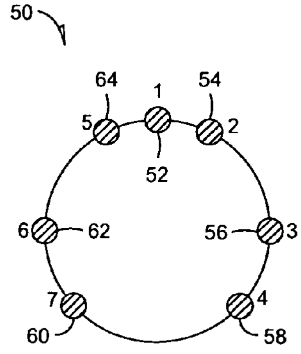
FIGS. 3A-3I show example listening scenarios in which multi-channel spatial reformatting to rear channels is performed according to an example embodiment.
Figure 3B:
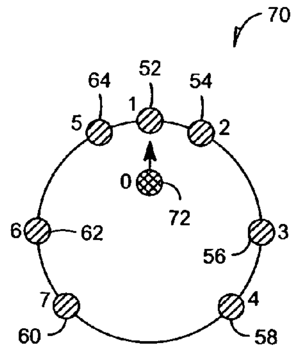

In an example listening scenario 70 shown in FIG. 3B, upon acceptance of a playback request for a new audio stream 72, gains of each of the current audio signals fed to the loudspeaker 12-24 via the channels 52-64 may be reduced to a 'background' level. It will be appreciated that the level to which the current audio signals provided via the playback channels 52-64 may vary from embodiment to embodiment.

Figure 3C:
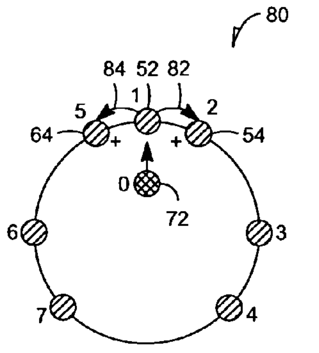
Figure 3D:
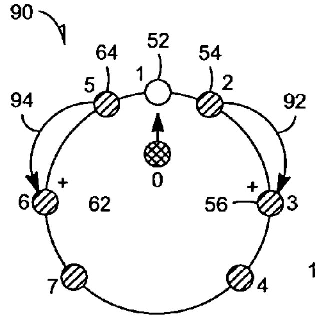
Figure 3E:
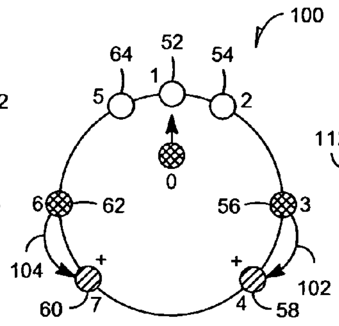

In an example listening scenario 80 shown in FIG. 3C, the audio signal in playback channel 52 (e.g., rendered through loudspeaker 20) may be mixed with the audio signal in channel 54 and with the audio signal in channel 64 (see loudspeakers 14 and 12 in FIG. 1) by appropriate pair-wise panning (see arrows 82 and 84). The combined audio signals in channels 54 and 64 may be represented as new audio signals $submix_{1+2}$ and $submix_{1+5}$, respectively. In an example embodiment, after the panning 82, 84 the audio signal originally rendered via playback channel 52 may be totally removed from that playback channel and the playback channel may thus be silent.

Thereafter, as shown in listening scenario 90 (see FIG. 3D), the audio signals $submix_{1+2}$ and $submix_{1+5}$ may be panned (see arrows 92 and 94) into audio signals currently in channels 56 and 62, respectively. The combined audio signals in channels 56 and 62 may be represented as new audio signals $submix_{1+2+3}$ and $submix_{1+5+6}$, respectively. In an example embodiment, after the sequential panning 82, 84 the combined audio signals originally rendered via channels 54 and 64 ($submix_{1+2}$ and $submix_{1+5}$) may be totally removed from playback channels 54 and 64 respectively and the playback channels 54 and 64 may thus be silent.

As shown in listening scenario 100 (see FIG. 3E), the audio signals $submix_{1+2+3}$ and $submix_{1+5+6}$ may then be panned (see arrows 102 and 104) into new audio signals in the channels 58 and 60, respectively. The audio signals in the playback channels 58 and 60 may be represented as new audio signals $submix_{1+2+3+4}$ and $submix_{1+5+6+7}$, respectively. Thus, in an example embodiment, audio signals may be sequentially panned between adjacent channels along a first and second panning paths 112 and 114 (see FIG. 3F).

As mentioned above, the volume of the current audio may be reduced to a background level. Accordingly, the volume of the audio signals $submix_{1+2+3+4}$ and $submix_{1+5+6+7}$ may be lower than the initial volume of the audio signal prior to panning. In an example embodiment, prior to introduction of the new audio stream (e.g., event audio), and after the sequential panning, the playback channels 54, 56, 62 and 64 may be silent.

Figure 3F:
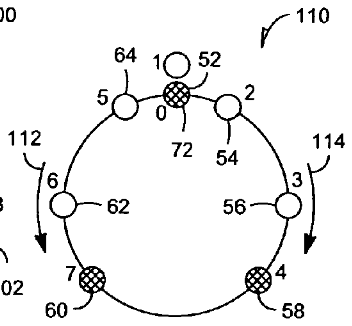
Figure 3G:
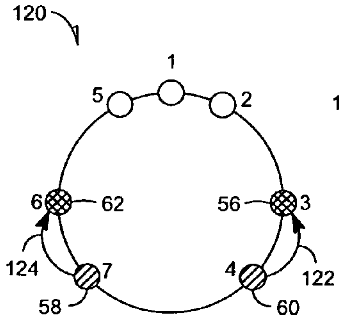
Figure 3H:
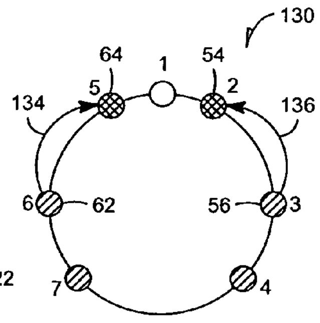
Figure 3I:
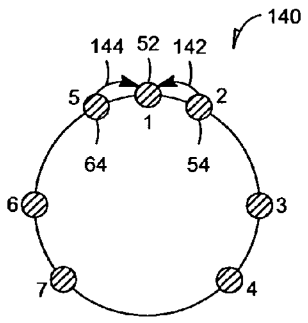

In FIG. 3F, a listening scenario 100 is shown where the new audio stream 72 is provided in the channel 52 and, for example, rendered via the loudspeaker 20 (e.g., a front-center channel). While the new audio stream persists, the audio that was rendered prior to an audio event giving rise to the new audio stream may thus be reformatted so that it is provided through the audio playback channels 58, 60. The audio streams provided in the channels 58, 60 may then be rendered at a lower or background volume level through the loudspeakers 18 and 16. The new audio stream 72 may thus be provided via the audio playback channel 52 and rendered in the foreground through the loudspeaker 20 (or as a virtualized sound source).

When the event triggering the insertion of the new audio stream 72 terminates (e.g., a user has completed a voice telephone call or video call), the audio stream 72 may be removed and the audio signals 52-64 may be reformatted or configured to their original state or format.

For example, upon termination of the event, a sequence of sequential reverse cross-fades/pans may be performed wherein the functionality shown in FIGS. 3A-3E is reversed. Thus, the audio signals $submix_{1+2+3}$ and $submix_{1+5+6}$ may be extracted from the audio signals $submix_{1+2+3+4}$ and $submix_{1+5+6+7}$, respectively and panned back to their original playback channels (see arrows 122 and 124). The audio signals $submix_{1+2}$ and $submix_{1+6}$ may be extracted from the audio signals $submix_{1+2+3}$ and $submix_{1+5+6}$, respectively and panned back to their original playback channels (see arrows 142 and 144). Finally, in the illustrated example embodiment, the audio signal originally provided via channel 52 may be extracted from the audio signals $submix_{1+2}$ and $submix_{1+5}$ and panned to its original playback channel (see arrows 142 and 144). In an example embodiment, per-channel gains of each of the audio signals may be returned to their original state or level. Accordingly, the audio rendered may once again be in the foreground and not in the background.

As mentioned above, it is important to note that the channels 52-64 may be real or virtual playback channels (and any number of channels). Thus, the sequential panning may be between adjacent pairs of virtualized channels created by an appropriate HRTF, or between real or physical loudspeaker speaker channels.

It should also be noted that a system involving seven locations (virtualized or provided by a corresponding loudspeaker) has been illustrated merely by way of example. In some embodiments more locations (or channels) may be provided and, other embodiments, less locations (or channels) may be provided.

In an example embodiment, the incoming new audio stream 72 may be placed as an audio stream in any channel 52-64. Thus, in the example system 10, the new audio stream may be rendered through any of the loudspeakers 52-64. When the new audio stream is provided via one of the other audio channels 54-64, all other channels may be reformatted in a similar fashion described above. When reformatting the audio streams after the audio event has terminated, in an example embodiment a stereo down-mix of the original content in the two channels most distant from the higher priority stream (e.g., the new stream 72) may be performed. Thus, the combined audio signals sequentially up-mixed along the first and second panning paths 112 and 114 may be down-mixed in a reverse direction along the panning paths 112 and 114.

Although the new incoming audio stream is represented by a single channel in the example embodiment, it should be noted that it is not limited to a single channel. For example, the new incoming audio stream may comprise multiple audio signals such as a stereo stream and, for example, be provided in audio channels 54 and 64.

In FIG. 4A-4I a sequence of events is shown during which an audio device processes an incoming audio signal to provide a multi-channel spatial reformatted mix to single rear playback channel.

Figure 4A:
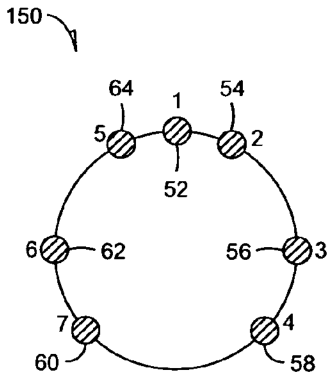
FIGS. 4A-L show example listening scenarios in which multi-channel spatial reformatting to a single rear channel is performed according to an example embodiment.

In an example default listening scenario 150 shown in FIG. 4A, it is assumed for illustrative purposes that a current audio stream is being reproduced on a seven loudspeaker-based reproduction system (e.g., see FIG. 1) before, for example, an event with an associated incoming high priority audio stream makes a playback request. Although the example embodiment is described with reference to the system 10 having seven loudspeakers providing real playback channels, it should be noted that the methodology is equally applicable in a system having virtualized playback channels.

Figure 4B:
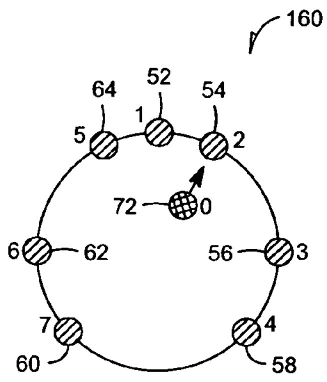

Upon acceptance of the playback request (e.g., in response to an event such as an incoming audio or video call) providing a new incoming audio stream 72, gains of each individual audio signal in channels 52-64 may be reduced to a lower or 'background' level as shown by listening scenario 160 in FIG. 4B.

Figure 4C:
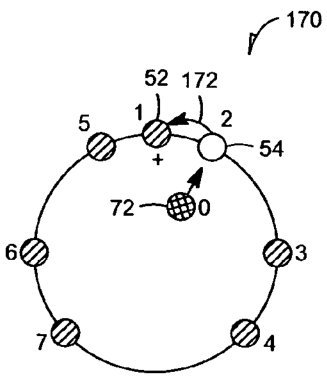
Figure 4D:
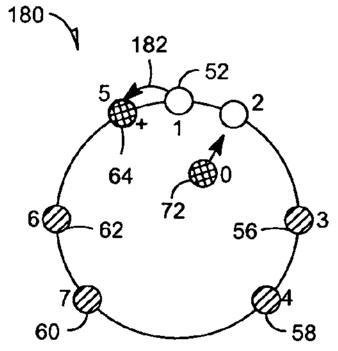
Figure 4E:
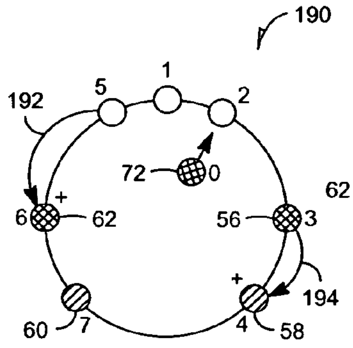

The audio signal in the channel to be occupied by the new communication (audio channel 54 in the example embodiment) may be panned and added to the audio signal in adjacent channel (channel 52 in the example embodiment) providing a combined audio signal $submix_{2+1}$. An example listening scenario 170 illustrating this panning (see arrow 172) is shown in FIG. 4C. In an example embodiment, the volumes or output levels of audio signals in the channels 56-64 may remain unchanged.

As shown in example listening scenario 180 (see FIG. 4D), audio signal $submix_{2+1}$ may be panned and added to the audio signal in channel 64 (see arrow 182) providing a resulting audio signal $submix_{2+1+5}$. Thereafter, as shown by arrow 192 in listening scenario 190, the audio signal $submix_{2+1+5}$ may be panned and added to the audio signal in audio channel 62

(see FIG. 4E) providing a combined audio signal $submix_{2+1+5+6}$. In an example embodiment, at the same time, the audio signal in channel 56 may be panned (see arrow 194) and added to the audio signal in channel 58 providing a resulting combined audio signal $submix_{3+4}$.

Figure 4F:
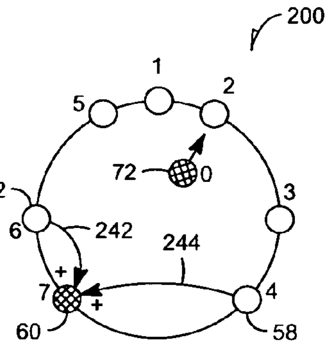
Figure 4G:
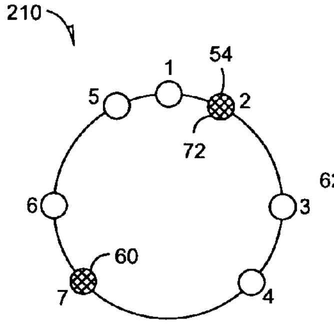
Figure 4H:
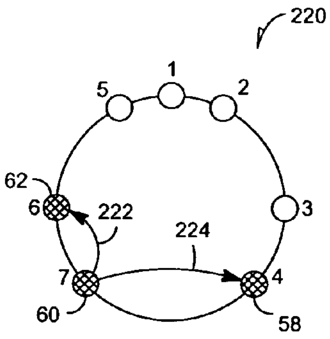
Figure 4I:
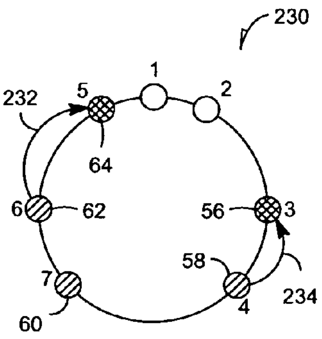

Thereafter, for example, the audio signals $submix_{2+1+5+6}$ and $submix_{3+4}$ may both be panned and mixed into an audio signal provided via channel 60 as shown by arrows 242 and 244 in the examples listening scenario 200 (see FIG. 4F). The audio signal provided via channel 60 may provide a final sub-mix As shown in listening scenario 210 (see FIG. 4G), the new incoming audio stream (e.g., a higher priority communication) may provided in the playback channel 54. The original audio signal may be simultaneously provided in the audio playback channel 60 at a lower or background volume level.

Upon termination of the event giving rise to the new incoming audio stream (e.g., termination of a voice or video call), and the higher priority communication has completed, as shown in listening scenario 220 (see FIG. 4H), the audio signals $submix_{2+1+5+6}$ and $submix_{3+4}$ may be extracted from the final sub-mix provided by audio playback channel 60 and panned back to their original locations or channels (see arrows 222 and 224). Thereafter, as shown by way of example in listening scenario 230 in FIG. 41, the audio signal $submix_{2+1+5}$ may be extracted from the audio signal $submix_{2+1+5+6}$ (provided in channel 60) and panned back to its original location or channel 62 as shown by arrow 232. In an example embodiment, at the same time, the audio signal in channel 56 may be extracted from the audio signal $submix_{3+4}$ and panned back to its original location or channel 56 (see arrow 234).

Figure 4J:
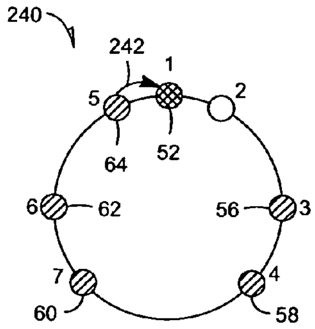
Figure 4K:
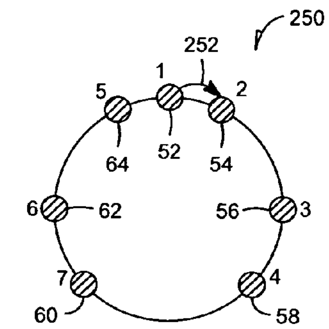

Thereafter, for example, the audio signal $submix_{2+1}$ may be extracted from the audio signal $submix_{2+1+5}$ and panned back to its original location or channel 52 as shown in by arrow 242 in listening scenario 240 (see FIG. 4J). The original audio signal in channel 54 may then be extracted from the audio signal $submix_{2+1}$ and panned back to its original location or channel 54 as shown by arrow 252 in listening scenario 250 (see FIG. 4K).

Figure 4L:
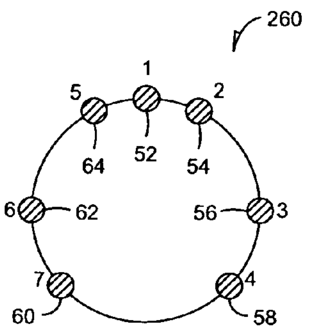

Finally, as shown in listening scenario 260, the per-channel gains of the original audio signals (e.g., feeding the loudspeakers 12-24) may be returned to their original state or level. Accordingly, the original audio signals are no longer reformatted audio signals provided in the background but once again primary audio signals. Thus, in the example embodiment shown in FIGS. 4A-4L, audio rendering returns to its original configuration after the incoming audio stream terminates (e.g., the event giving rise to the new incoming audio stream has terminated) as shown in listening scenario 150 (see FIG. 4A) and listening scenario 260 (see FIG. 4L).

As in the case of panning in the listening scenarios 50-140, fewer or more channels (carrying audio signals) may be provided in other example embodiments of the listening scenarios 150-260.

It should be noted that the new incoming audio stream 72 could be provided in any of the playback channels 52-64 (or on any one or more channels), with all other channels acting in a similar fashion to create a mono down-mix of the original content in any other playback channel. Further, although the new incoming audio stream 72 in the example listening scenarios 150-260 is represented as a single audio signal, the methodology described herein is not limited to incoming audio associated with a single signal. Thus, the secondary audio stream may be a multi-channel stream (e.g., a stereo stream) or the like.

Referring to FIGS. 5A-5F, reference numerals 300, 310, 320, 330, 340, and 350 generally indicate example listening scenarios in which reformatting of a stereo soundtrack to a single rear channel is performed.

Figure 5A:
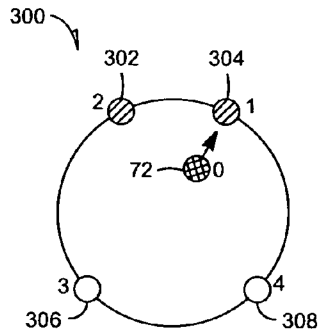
FIGS. 5A-5F show example listening scenarios in which reformatting of a stereo soundtrack to a single rear channel is performed according to an example embodiment.
Figure 5B:
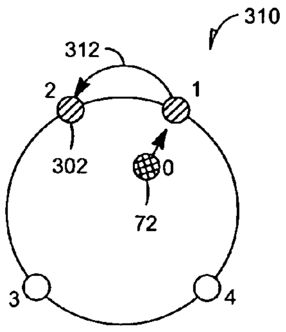
Figure 5C:
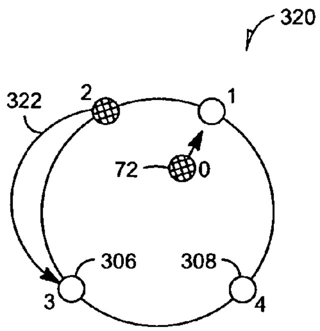
Figure 5D:
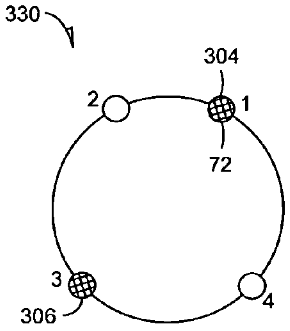

The example default listening scenario 300 shown in FIG. 5A assumes, for the purpose of illustration, a multi-channel listening system (4-channel in this example embodiment) and a stereo listening experience, whereby an audio soundtrack is provided by front left and right channels 302 and 304 only before a new incoming high priority stream 72 makes a playback request on. The high priority request is shown by way of example to be made on the right channel 304.

Initially, the gains of each individual channel 302 and 304 may be reduced to a 'background' level. Thereafter, the original audio signal provided via channel 304 may panned (see arrow 312 in the listening scenario 310) and added to the audio signal in channel 302 resulting in a combined audio signal $submix_{1+1}$ provided via the channel 302. Thereafter, as shown by arrow 322 in the listening scenario 320, the audio signal $submix_{1+2}$ may be panned and mixed into the audio signal provided via channel 308 (see FIG. 5C). The new incoming audio stream 72 may then be provided by the audio channel 304 as shown in the listening scenario 330.

Figure 5E:
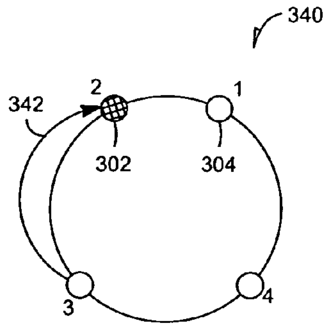
Figure 5F:
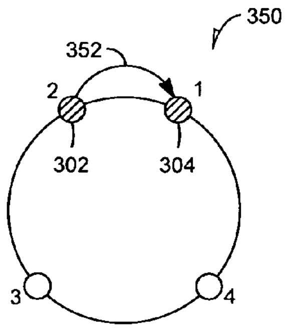

When the new audio stream or communication is terminated, the audio signal $submix_{1+2}$ is panned back to the audio signal provided via channel 302 as shown by arrow 342 in listening scenario 340 (see FIG. 5E). The audio signal provided in channel 304 may be extracted from the audio signal $submix_{1+2}$ and panned back to its original location or channel 304 as shown in listening scenario 352 (see FIG. 5F). Then, the audio configuration may be reformatted back to its original state prior to receiving an external event (e.g., an incoming audio stream from a telephone or video conference call).

As in the case of panning in the listening scenarios 50-140 and 150-260, example embodiments of the panning in the listening scenarios 300-350 fewer or more channels (carrying audio signals) may be provided in other example embodiments. Further, in an example embodiment the new incoming audio stream could be placed on any channel, with all other channels acting in a similar fashion to create a mono downmix of the original content in any other channel. While the incoming stream is represented merely by way of example as a single channel, it is not limited to a single channel and two or more channels may be provided in other example embodiments. In an example embodiment post processing of the panned and mixed audio signals may be performed.

Referring to FIGS. 6A-6D, reference numerals 400, 410, 420 and 430 generally indicate example listening scenarios in which ambience-based spatial reformatting of stereo audio such as a stereo soundtrack to pair of rear playback channels is performed.

In certain scenarios, generating a multi-channel surround soundtrack from a stereo original may be required. The multichannel sound track may be generated by extracting reverb and ambience from original content and redistributing that ambience across all channels. In this example scenario, only the ambience may be played in the rear channels while a higher priority stream is being played in one or more of the front channels. The listening scenarios 400-430 provided such an example embodiment.

Figure 6A:
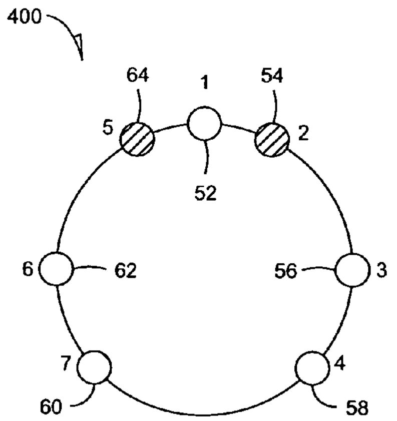
FIGS. 6A-6D show example listening scenarios in which ambience-based spatial reformatting of a stereo soundtrack to pair of rear channels is performed according to an example embodiment.
Figure 6B:
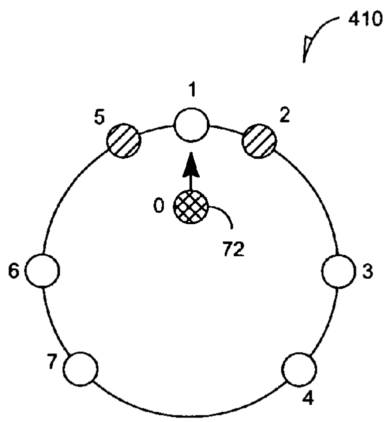

In FIG. 6A an example default listening scenario 400 assumes a multi-channel listening system (7-channel in this example embodiment) and stereo source material. The listening scenarios 400-430 shown in FIGS. 6A-6D may be generated by the system 10 shown in FIG. 1 and, accordingly, is described by way of example with reference thereto. In an example embodiment, the reproduction system may be capable of extracting ambience in a stereo recording and redistributing this ambience around all channels 52-64. The ambience up-mix may or may not be enabled before a new incoming audio stream 72 (e.g., a new incoming high priority audio stream) makes a playback request, for example on audio channel 54 (see FIG. 6B). In an example embodiment, an ambience extraction algorithm may be enabled if it was disabled prior to receiving the new incoming audio stream 72 (e.g., in response to an external event such as an incoming call (VoIP or otherwise)).

Figure 6C:
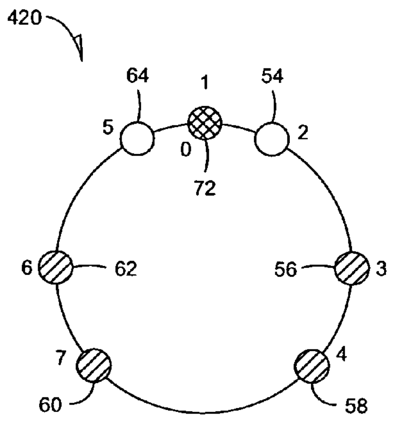

In response to the new incoming audio stream 72, audio signals in the audio channels 54 and 64 (e.g., front channels) may be faded or attenuated and audio signals in the channels streams 56-62 (e.g., the rear ambience channels) may be faded up as shown in listening scenario 420 in FIG. 6C.

Figure 6D:
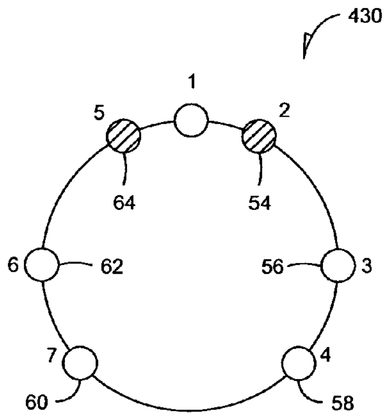

When the new incoming audio stream 72 (e.g., the higher priority audio stream) terminates, the levels of the audio signals in the audio channels 54 and 64 (e.g., front channels) and audio channels 56-62 (e.g., the surround channels) may restored to their previous state as shown in the listening scenario 430 in FIG. 6D. In an example embodiment, up-mix algorithm is disabled if it was not enabled before the higher priority stream made its request. While the incoming stream 72 is represented merely by way of example as a single audio signal, it is not limited to a single signal and two or more signals may be provided in other example embodiments. The incoming stream could be placed on any channel, with all other channels acting in a similar fashion to create an ambient representation of the lower-priority soundtrack.

Figure 7:
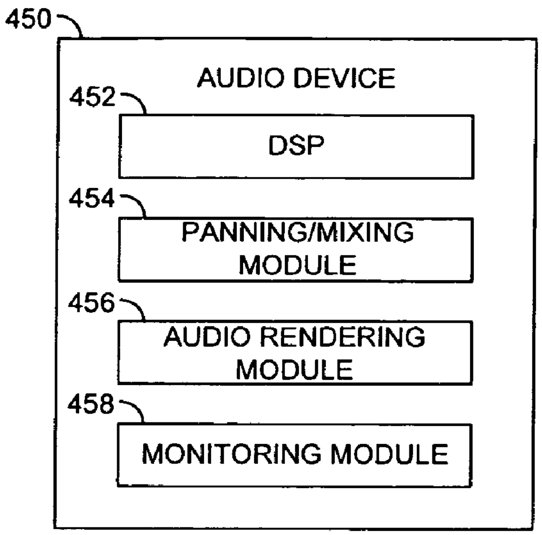
FIG. 7 shows example functional modules of an audio rendering device according to an example embodiment.

FIG. 7 shows an example embodiment of an audio device 450 to process in event such as an incoming telephone call or video call. The audio device 450 may be integrated within the audio device 28 (see FIG. 1). By way of example, the audio device 450 is shown to include a Digital Signal Processor (DSP) 452, a panning/mixing module 454, an audio rendering module 456, and a monitoring module 458. It will be appreciated that the modules for 52, 454, and 456 functional modules and that any one or more of the modules may be integrated into a single module. Further, the audio device 450 may have many other functional modules commonly associated with audio devices such as home theater systems or the like. The audio device 450 may perform the functionality described above with reference to FIGS. 2-6.

Figure 8:
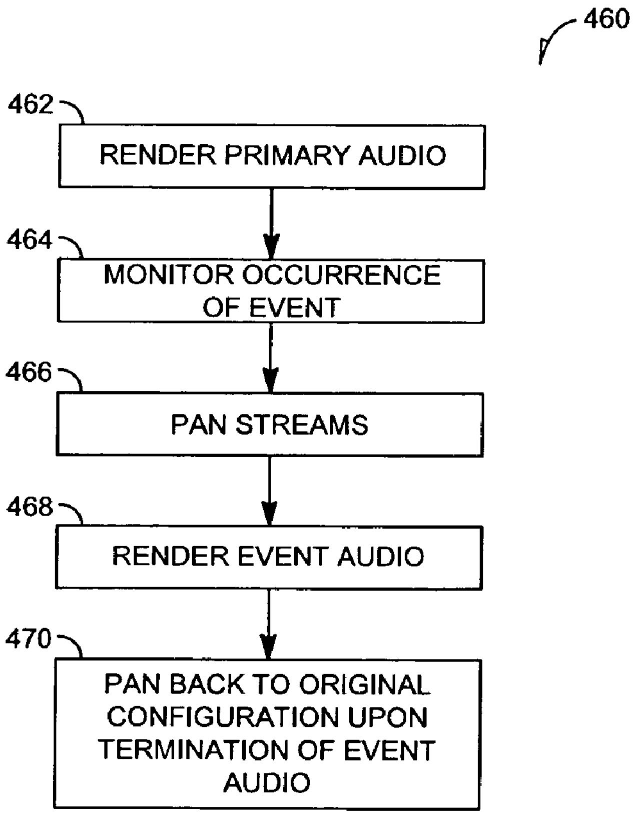
FIG. 8 shows example flow diagram of a method, according to an example embodiment, of processing an event on an audio rendering device.

In FIG. 8, a flow chart is shown of an example method 460 to process an audio event on an audio device. The method 460 may be performed on the audio device 450 and, accordingly, is described by way of example with reference thereto. As shown a block 462, the method 460 may initially be rendering audio (e.g., primary audio) via a plurality of audio signals in associated channels (virtual or otherwise). Thereafter, as shown a block 464, the method 460 monitors for the occurrence of an event. For example, the event may be an incoming telephone call, video call, or any and the event having associated event audio that requires rendering through the audio device 450. Upon occurrence of the audio event, as shown a block 466, audio signals (e.g. sequentially from adjacent channel to adjacent channel) are panned until a submix of audio signals in adjacent channels is faded to a destination channel. Thereafter, for example, the event audio is rendered via the first audio channel (see block 468). When the audio event terminates (e.g., the telephone call ends), and audio signals are once again sequentially panned that in a reverse direction from the destination channel to the first panned audio channel (see block 470).

Figure 9:
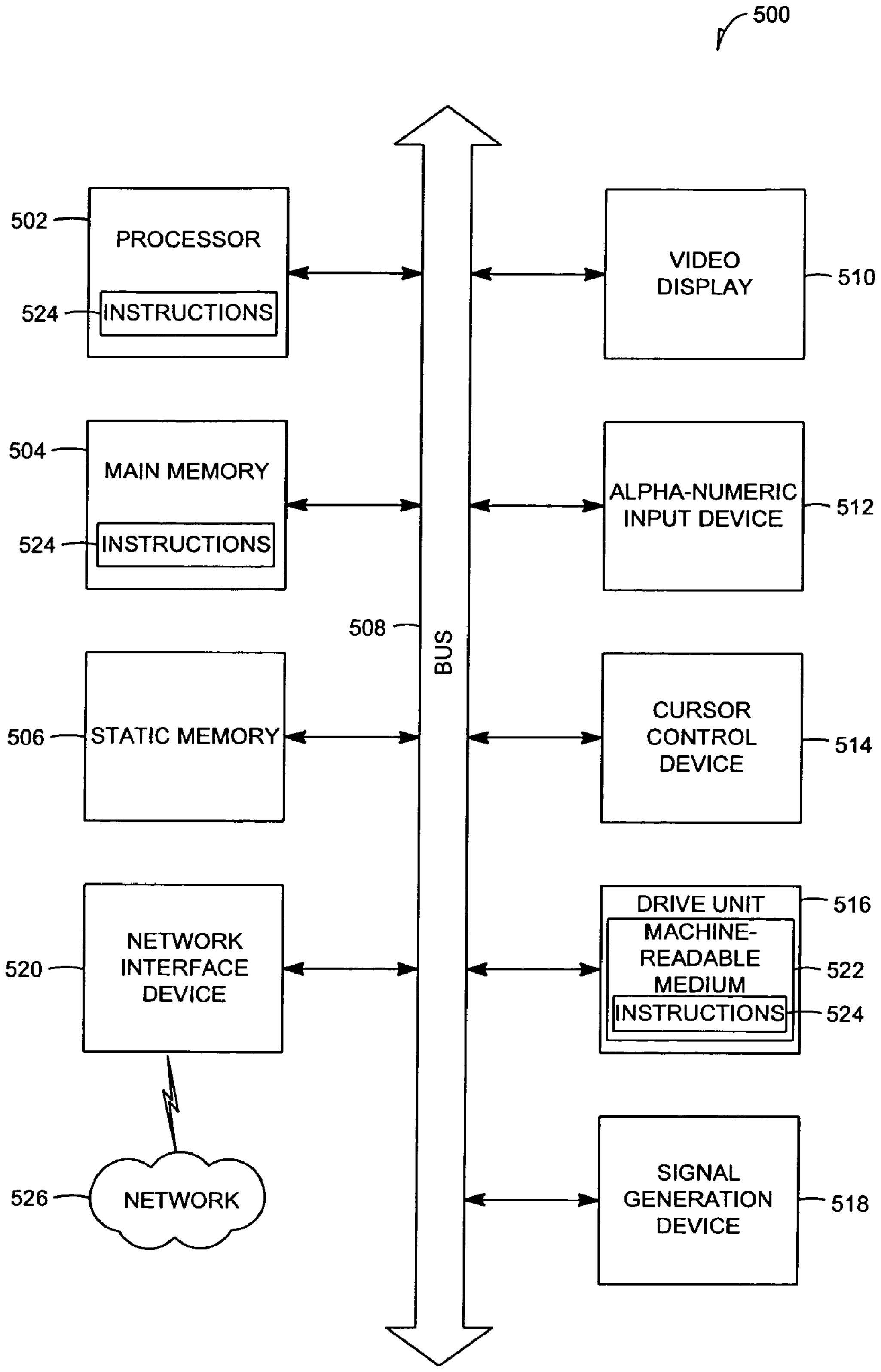
FIG. 9 shows a diagrammatic representation of machine in the example form of the computer system within which a set of instructions, for causing the machine to perform any one of the methodologies discussed herein, may be executed.

FIG. 9 shows a diagrammatic representation of machine in the exemplary form of a computer system 500 within which a set of instructions, for causing the machine to perform any one or more of the methodologies discussed herein, may be executed. In alternative embodiments, the machine operates as a standalone device or may be connected (e.g., networked) to other machines. The machine may be a client computer, a personal computer (PC), a tablet PC, a set-top box (STB), a Personal Digital Assistant (PDA), a cellular telephone, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU), a graphics processing unit (GPU) and/or Digital Signal Processing (DSP) unit), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a loudspeaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method of processing an event on an audio rendering device, the method comprising:

rendering a first audio stream via at least a first audio signal in a first audio playback channel and a second audio signal in a second audio playback channel;

monitoring occurrence of the event with an associated second audio streams, wherein the event is an incoming call; and upon occurrence of the event, panning the first audio signal to the second audio playback channel, the first audio signal being mixed with the second audio signal in the second audio playback channel to render both the first and second audio signals on the second audio playback channel; and rendering the second audio stream via the first audio playback channel when the first and second audio signals are rendered on the second audio playback channel.

2. The method of claim 1, which comprises panning the first audio signal back to the first audio playback channel upon termination of the event.

3. The method of claim 1, wherein the second audio stream is a voice communication.

4. The method of claim 1, in which the panning comprises:

progressively decreasing an amplitude of the first audio signal in the first audio playback channel; and progressively increasing an amplitude of the first audio signal in the second audio playback channel.

5. The method of claim 1, wherein the first and second audio playback channels are loudspeaker channels.

6. The method of claim 1, wherein the first and second audio playback channels are virtualized loudspeaker channels and wherein the first and second audio playback channels are virtualized after the panning and the mixing.

7. The method of claim 1, which comprises rendering a plurality of audio signals in a plurality of audio channels in a first panning path and a second panning path, the method comprising:

sequentially panning and mixing audio signals in adjacent audio playback channels in the first panning path towards a first destination playback channel;

sequentially panning and mixing audio signals in adjacent audio playback channels in the second panning path towards a second destination playback channel;

upon termination of the event, sequentially panning and extracting audio signals in adjacent audio playback channels in the first panning path to restore each audio playback channel back to its original configuration prior to panning and mixing; and sequentially panning and extracting audio signals between adjacent audio playback channels in the second panning path to restore each audio playback channel back to its original configuration prior to panning and mixing.

8. The method of claim 7, wherein the first and second destination playback channels coincide.

9. The method of claim 1, which comprises:

reducing the volume of the first audio stream relative to the volume of the second audio stream;

rendering the first audio stream as background audio; and rendering the second audio stream as foreground audio.

10. The method of claim 1, which comprises:

rendering the first audio signal in the first audio playback channel to a first loudspeaker and the second audio signal in the second playback channel to a second loudspeaker;

performing the panning and mixing of the first audio signal from the first audio playback channel to the second audio playback channel to provide a first combined audio signal; and panning and mixing the first combined audio signal from the second audio playback channel to a third audio playback channel to provide a second combined audio signal rendered by a third loudspeaker.

11. The method of claim 10, wherein the first audio playback channel is a front-right loudspeaker channel, the second audio playback channel is a front-left loudspeaker channel, and the third audio playback channel is a rear-left loudspeaker channel.

12. The method of claim 10, wherein the second audio stream is provided via the first audio playback channel after the first audio signal has been sequentially panned to the third audio playback channel.

13. The method of claim 1, comprising:

generating multi-channel surround sound audio comprising two front playback channels and at least two ambience playback channels;

upon occurrence of the event, fading out the audio from the two front playback channels;

increasing the volume of the audio rendered via the ambience playback channels; and rendering the second audio stream via a center playback channel.

14. The method of claim 1, which comprises virtualizing a plurality of loudspeakers using Head-Related Transfer Functions (HRTFs).

15. An audio rendering device to process an event, the device comprising:

an audio rendering module to render a first audio stream via at least a first audio signal in a first audio playback channel and a second audio signal in a second audio playback channel;

a monitoring module to monitor occurrence of the event with an associated second audio stream, wherein the event is an incoming call; and a panning module to pan the first audio signal to the second audio playback channel upon occurrence of the event, the first audio signal being mixed with the second audio signal in the second audio playback channel to render both the first and second audio signals on the second audio playback channel, wherein the second audio stream is rendered via the first audio playback channel when the first and second audio signals are rendered on the second audio playback channel.

16. The device of claim 15, wherein the first audio signal is panned back to the first audio playback channel upon termination of the event.

17. The device of claim 15, wherein the second audio stream is a voice communication.

18. The device of claim 15, in which the pan module is configured to:

progressively decrease an amplitude of the first audio signal in the first audio playback channel; and progressively increase an amplitude of the first audio signal in the second audio playback channel.

19. The device of claim 15, wherein the first and second audio playback channels are loudspeaker channels.

20. The device of claim 15, wherein the first and second audio playback channels are virtualized loudspeaker channels and wherein the first and second audio playback channels are virtualized after the panning and the mixing.

21. The device of claim 15, in which a plurality of audio signals in a plurality of audio channels are rendered in a first panning path and a second panning path, the panning module being configured to:

sequentially pan and mix audio signals in adjacent audio playback channels in the first panning path towards a first destination playback channel;

sequentially pan and mix audio signals in adjacent audio playback channels in the second panning path towards a second destination playback channel;

upon termination of the event, sequentially pan and extract audio signals in adjacent audio playback channels in the first panning path to restore each audio playback channel back to its original configuration prior to panning and mixing; and sequentially pan and extract audio signals between adjacent audio playback channels in the second panning path to restore each audio playback channel back to its original configuration prior to panning and mixing.

22. The device of claim 21, wherein the first and second destination playback channels coincide.

23. The device of claim 15, wherein:

the volume of the first audio stream is reduced relative to the volume of the second audio stream;

the first audio stream is rendered as background audio; and the second audio stream is rendered as foreground audio.

24. The device of claim 15, wherein:

the first audio signal is rendered in the first audio playback channel to a first loudspeaker and the second audio signal is rendered in the second playback channel to a second loudspeaker;

the first audio signal from the first audio playback channel is panned and mixed into the second audio playback channel to provide a first combined audio signal ; and the first combined audio signal from the second audio playback channel is panned and mixed into a third audio playback channel to provide a second combined audio signal rendered by a third loudspeaker.

25. The device of claim 24, wherein the first audio playback channel is a front-right loudspeaker channel, the second audio playback channel is a front-left loudspeaker channel, and the third audio playback channel is a rear-left loudspeaker channel.

26. The device of claim 24, wherein the second audio stream is provided via the first audio playback channel after the first audio signal has been sequentially panned to the third audio playback channel.

27. The device of claim 15, which comprises a digital signal processor to:

generate multi-channel surround sound audio comprising two front playback channels and at least two ambience playback channels;

upon occurrence of the event, fade out the audio from the two front playback channels;

increase the volume of the audio rendered via the ambience playback channels; and render the second audio stream via a center playback channel.

28. The device of claim 15, which comprises a digital signal processor to virtualize a plurality of loudspeakers using Head-Related Transfer Functions (HRTFs).

29. The device of claim 15, wherein the at least part of the functionality of the audio rendering module, the monitoring module and the cross-fade module is performed by one or more processors.

30. An audio rendering device to process an event, the device comprising:

means for rendering a first audio stream via at least a first audio signal in a first audio playback channel and a second audio signal in a second audio playback channel;

means for monitoring occurrence of the event with an associated second audio stream, wherein the event is an incoming call;

means for panning the first audio signal to the second audio playback channel upon occurrence of the event, the first audio signal being mixed with the second audio signal in the second audio playback channel to render both the first and second audio signals on the second audio playback channel; and means for rendering the second audio stream via the first audio playback channel when the first and second audio signals are rendered on the second audio playback channel.

31. A machine-readable storage medium embodying instructions which, when executed by a machine, cause the machine to:

render a first audio stream via at least a first audio signal in a first audio playback channel and a second audio signal in a second audio playback channel;

monitor occurrence of an event with an associated second audio stream, wherein the event is an incoming call;

upon occurrence of the event, pan the first audio signal to the second audio playback channel, the first audio signal being mixed with the second audio signal in the second audio playback channel to render both the first and second audio signals on the second audio playback channel; and render the second audio stream via the first audio playback channel when the first and second audio signals are rendered on the second audio playback channel.

* * * * *

UNITED STATES PATENT AND TRADEMARK OFFICE

CERTIFICATE OF CORRECTION

PATENT NO. : 7,555,354 B2
APPLICATION NO. : 11/584125
DATED : June 30, 2009
INVENTOR(S) : Martin Walsh et al.

It is certified that error appears in the above-identified patent and that said Letters Patent is hereby corrected as shown below:

On the title page, item (56), under "Other Publications", in column 2, line 1, delete "PCT/GB01597," and insert -- PCT/GB/01597, --, therefor.

In column 1, line 51, delete "4A-L" and insert -- 4A-4L --, therefor.

In column 7, line 11, delete "sub-mix" and insert -- sub-mix. --, therefor.

In column 8, line 18, delete "$submix_{1+1}$" and insert -- $submix_{1+2}$ --, therefor.

In column 10, line 65, in Claim 1, delete "streams," and insert -- stream, --, therefor.

Signed and Sealed this

Sixth Day of October, 2009

David J. Kappos

David J. Kappos
*Director of the United States Patent and Trademark Office*